March 22, 1960  H. ANGEL ET AL  2,929,930
X-RAY APPARATUS
Filed Aug. 12, 1958

United States Patent Office 2,929,930
Patented Mar. 22, 1960

2,929,930

X-RAY APPARATUS

Harald Angel and Heinz Giesswein, Vienna, Austria, assignors to Elin Aktiengesellschaft für elektrische Industrie, Vienna, Austria, an Austrian corporation Application August 12, 1958, Serial No. 754,589

Claims priority, application Austria August 16, 1957

1 Claim. (Cl. 250—57)

This invention relates to X-ray apparatus and more particularly to X-ray apparatus for fluoroscopy and radiography following immediately the observation on the fluoroscopic screen. More in detail this invention relates to an improvement of the equipment of such X-ray apparatus which is known as a spot film device for serialography.

A spot film device includes a fluoroscopic screen, a carriage holding a cassette and guided in tracks for movement between a retracted position and an advanced position, and a support structure for movement as a unit over the examination panel. The support structure also includes parts extending beneath the panel for mounting an X-ray source beneath the panel in a position registering with the X-ray sensitive material disposed above the panel. Furthermore a spot film device comprises means for moving the cassette from a position of storage (p o-tected position) to a position of exposure in line with the fluoroscent screen by a spring drive or other servo-mechanism.

In spot film devices known hitherto, in changing from position of storage to position of exposure the carriage for the cassette is moved coplanar with the table plane. Therefore a space to the right or to the left of the fluoroscopic screen has to be provided for the retracted cassette carriage enlarging in such a way the dimension of the spot film device over the breadth of the examination table. A part of the spot film device projecting beyond the table breadth on the right side offers an obstruction for the assistant in all examination positions, a part of the spot film device projecting beyond the table breadth on the left side hinders the passage of the examining physician especially by changing from a horizontal table position to a tilted position.

The primary object of the present invention is to indicate a spot film device offering minimum obstruction against access to the table for the operating physician and assistant. In accordance with this invention the disadvantage connected with the spot film devices of known constructions is avoided by departing from the usual practice to support the cassette carriage slidably only in a plane parallel with the plane of the table and by changing over to a spot film device supporting the cassette carriage in its retracted position in a plane perpendicular to the plane of the examination table and lying parallel with its longitudinal axis.

In the accompanying drawing.

Figure 1:
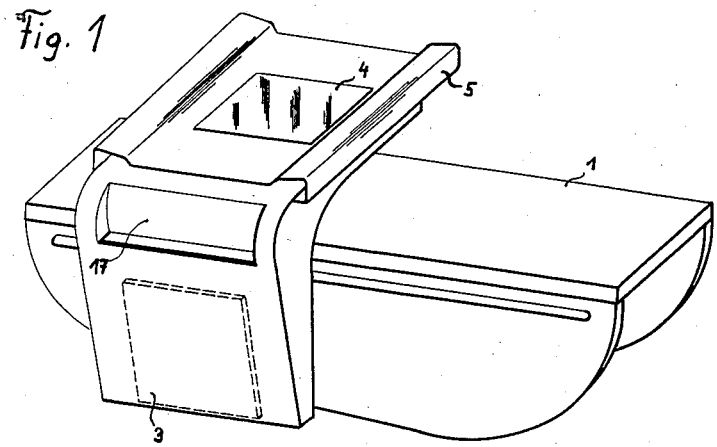
Fig. 1 shows schematically a perspective view of an X-ray apparatus embodying the spot film device according to the invention.
Figure 2:
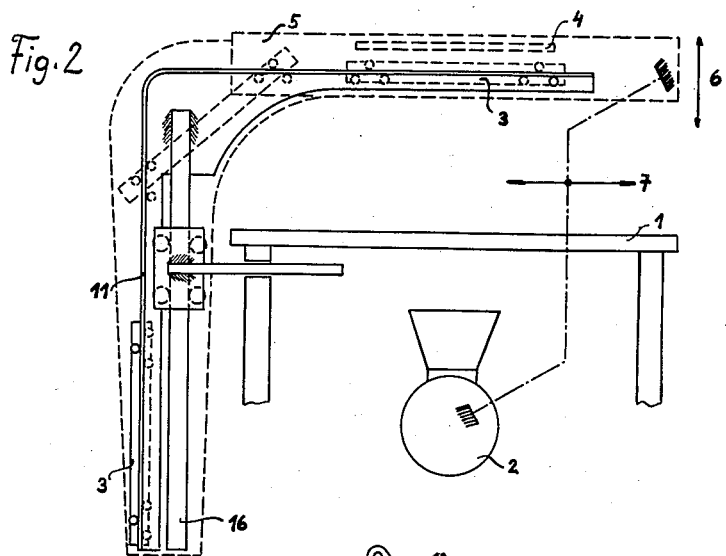
Fig. 2 shows in section, taken on a vertical plane, the guiding equipment for the cassette carriage on its way from the storage position to the operative position.

The illustrated apparatus comprises an examination table 1, a spot film device containing an X-ray tube 2 positioned beneath the table, a cassette carriage 3, a fluoroscopic screen 4 with its screening frame 5 and an inserting aperture 17 serving for the change of cassettes.

The arrows 6 and 7 indicate the directions of adjustability for the X-ray tube 2 and fluoroscopic screen 4 lying in a parallel plane above the cassette carriage in its operative position. The changing of the cassette carriage from one plane to another lying perpendicular thereto is performed by suitable guiding tracks 11 for the rollers of the cassette carriage mounted on the frame 16 for supporting the fluorescent screen and screening frame above the examination table and the X-ray tube beneath the examination table and guiding said parts as a unit on tracks of the examination table in parallel with its longitudinal axis. In order to reduce the weight of the parts which are to be moved in adjusting by the operating physician or assistant the upper part of said frame 16 is in the direction of arrow 6 slidably mounted in the lower part being movable only in longitudinal direction of the table. In doing so the cassette carriage does not participate in the adjusting movement in the direction of the arrows 6 and 7 in its storage position, therefore these movements may be actuated manually by the operators without the risk of undue exertion. There is no necessity to perform these movements by servomechanism to ease the handling. Only the movement in direction of the longitudinal axis of the table is loaded with the weights of the cassette, the cassette carriage and of the walls surrounding the cassette in its storage position and may therefore be actuated by servomechanism, while in usual spot film devices having the cassette in its retracted and exposed position in the same plane said weights are to be moved in three directions being perpendicular to each other.

Figure 3:
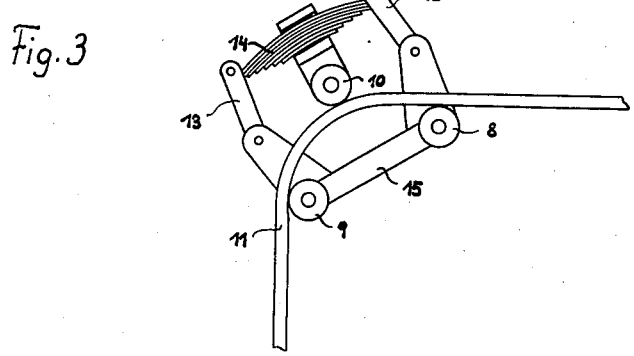
Fig. 3 shows one of the four guide trucks carrying the cassette carriage.

In order to get a satisfactory guidance for the cassette carriage from its storage position to its exposed position, the cassette carriage is suspended in four guide trucks being built as shown in Fig. 3 of the drawing. Each guide truck comprises three guiding rollers 8, 9, 10. Two rollers 8, 9 are pivoted on the trapezoidal frame 15 and run on the one side of a guiding rail 11 while the third roller 10 is squeezed to the other side of the rail 11 by a laminated spring 14 supported by two joint bars 12, 13 linked with the frame 15. In suspending the cassette carriage in such a way, a satisfactory passing over of the cassette from one position to the other being at a right angle to each other is assured.

By applying the inventive idea of shifting the cassette in a storage position perpendicular to the table plane there is no need to increase the distance of the physician from the fluoroscopic screen center line in passing along the horizontal table even if the cassette has a size of 40 x 40 cm., supposed that also in designing the members transmitting the adjusting movements of the fluoroscopic screen to the X-ray tube beneath the table parts of the transmitting members extending into the passage room of the physician are avoided.

What we claim is:

An X-ray apparatus having an examination table, a spot film device consisting of a housing containing a fluoroscopic screen, an X-ray tube housing with the X-ray tube and a cassette carriage, said carriage having an operative position above the table and a storage position below the table, said operative position being parallel with the plane of the examination table and said storage position being in a plane perpendicular to the plane of the examination table and lying parallel with the longitudinal axis of the examination table and having herein an initial setting to return immediately to the working position, means for guiding the cassette carriage from the storage position to the operating position, said means consisting of tracks being passable by the cassette carriage, said cassette carriage being suspended on four guide trucks, each of said guide trucks consisting of three guiding rollers, two of said guiding rollers being pivoted on a trapezoidal frame and running on the inner side of said guiding tracks, the third roller being squeezed to the outer side of the guiding tracks by a laminated spring, said spring being supported by two joint bars pivoted to said trapezoidal frame.

References Cited in the file of this patent

UNITED STATES PATENTS

| | | |
|---|---|---|
| 2,245,704 | Newman | June 17, 1941 |
| 2,668,912 | Goldfield et al. | Feb. 9, 1954 |
| 2,834,890 | Bastin et al. | May 13, 1958 |
| 2,849,620 | Koerner | Aug. 26, 1958 |